P. W. DODD.
SPRING SUPPORT FOR CYCLE SADDLES.
APPLICATION FILED OCT. 16, 1920.

1,403,749.

Patented Jan. 17, 1922.
2 SHEETS—SHEET 1.

Percy Wilfred Dodd
Inventor

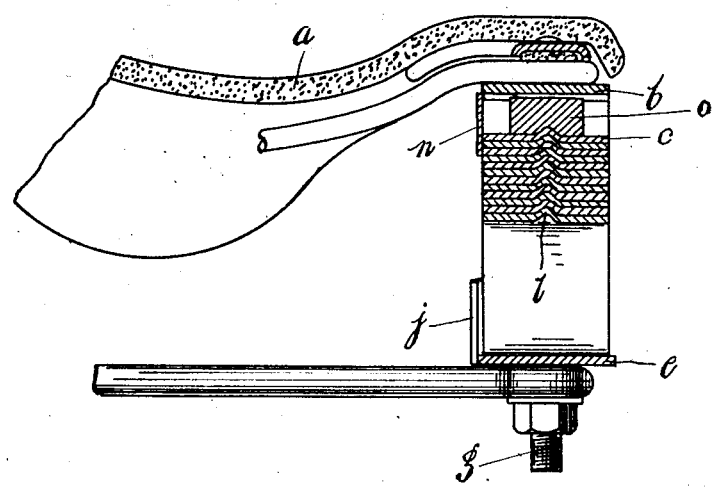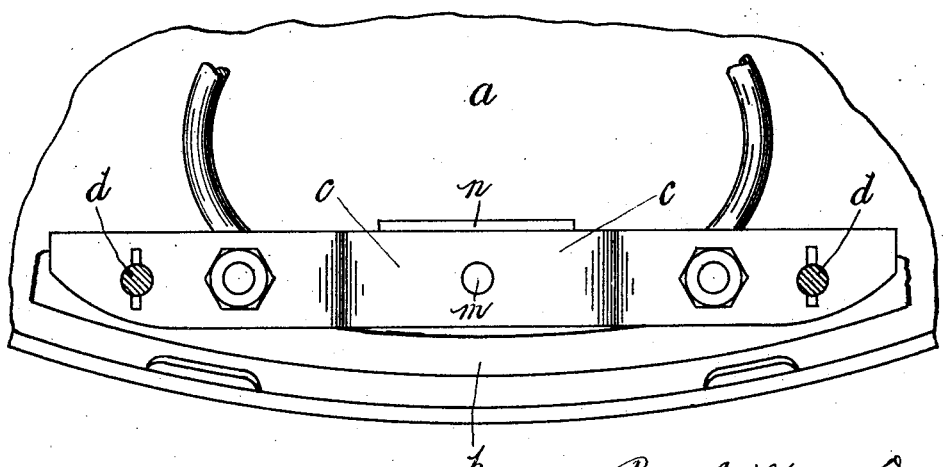

UNITED STATES PATENT OFFICE.

PERCY WILFRED DODD, OF STAFFORD, ENGLAND.

SPRING SUPPORT FOR CYCLE SADDLES.

1,403,749.  Specification of Letters Patent.  Patented Jan. 17, 1922.

Application filed October 16, 1920. Serial No. 417,402.

*To all whom it may concern:*

Be it known that I, PERCY WILFRED DODD, subject of the King of Great Britain, residing at 194 Ferndale, Doxey, Stafford, England, have invented certain new and useful Improvements Relating to Spring Supports for Cycle Saddles, of which the following is a specification.

My invention relates to the springing of saddles or seats for cycles, motorcycles and the like, and refers to saddles or seats wherein the conventional coil springs are replaced by laminated or leaf springs.

The object of my invention is to provide a spring for a seat or saddle which may be adjusted easily and rapidly to suit the weight of the rider so that the maximum advantage is obtained from the springing and the comfort of the rider is greatly increased. Hitherto this has only been possible by fitting a different set of springs but this is in general a lengthy operation and cannot conveniently be carried out where a number of riders of different weights are in the habit of using the same machine.

My invention is applicable to any saddle or seat on a vehicle of any description where springs are employed to support the weight of the rider, and may be adapted to replace the existing spring or springs of a saddle or seat.

In my invention the weight of the rider is supported by an adjustable laminated or leaf spring which is interposed between the supporting frame of the saddle and the seat portion which is usually formed of leather or similar flexible material. This spring is composed of a number of spring leaves or plates of bow or other suitable shape, the leaves being adapted to nest together and having means for locating them in relation to each other and to the rigid parts of the saddle. For this purpose each spring leaf or plate may for example be formed with a depression on one side forming a nib or projection on the other side and one part of the saddle frame may have a similar depression with a groove leading to it to facilitate insertion of the spring leaves.

Beyond this depression in the saddle part is a stop which may be conveniently formed as a projecting or turned-over lug. There may be more than one depression in the spring plates and in the saddle part if desired but I prefer one central depression which corresponds to the central part of each bow spring. Any one of the spring leaves is adapted to be easily withdrawn without necessarily disturbing the others and thus the strength of the spring may be simply and quickly varied.

In order that my invention may be easily understood I have illustrated one embodiment of my invention in the appended drawings.

Figure 3 is a longitudinal section on the center line of the saddle.

Figure 4 is an inverted section on the line 4—4 of Figure 2 with the spring removed.

Figure 1:
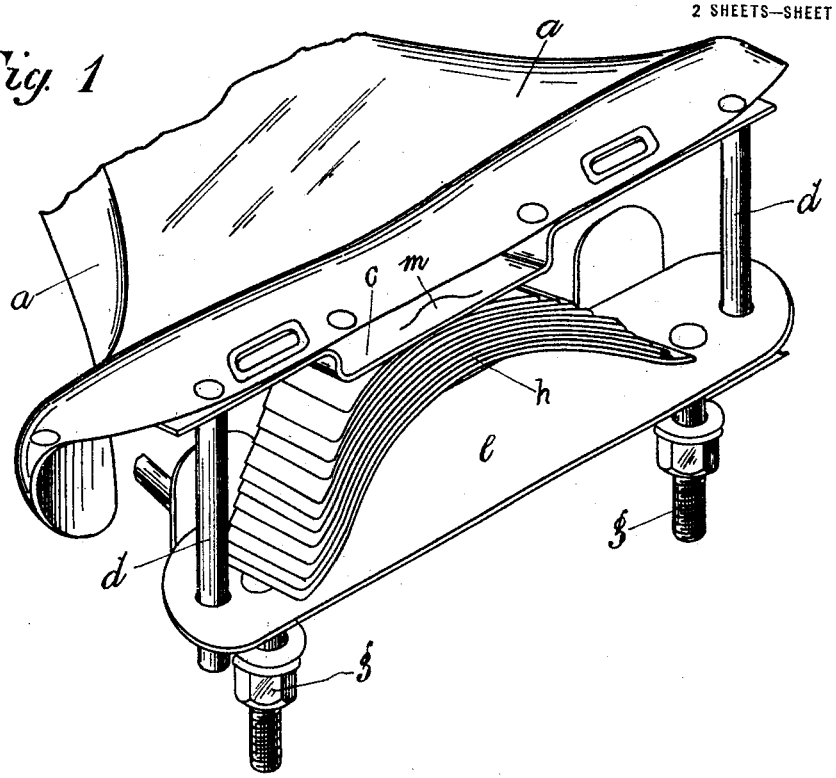
Figure 1 is a perspective view of my invention as applied to the rear portion of a cycle saddle.
Figure 2:
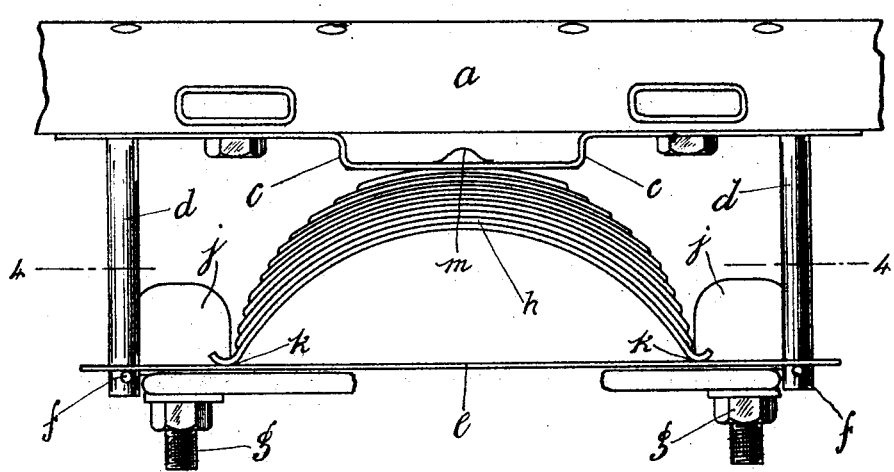
Figure 2 is a rear elevation thereof.

Similar letters refer to the same parts in all the figures of the drawings. The frame and front springing of the saddle shown are of the conventional type. The seat portion of the saddle $a$, of leather or other flexible material, is stretched between pommel and cantle plates which are distanced by a metallic framework of the usual form. A rear strip $b$ (Figs. 3 and 4) is arranged below the cantle plate, and to this strip is secured by two studs and nuts a strong metal strip of substantial width and preferably bent to the shape shown at $c$ Figures 1 and 2. This strip $c$ is slightly shorter than the width of the saddle seat. Rigidly secured near the outer ends of the strip $c$ are two guide pins $d$ $d$ extending vertically downwards and of suitable length. The pins $d$ $d$ pass through holes near the outer ends of another strong metal plate $e$, which is free to slide vertically on the guide pins $d$ $d$. Cotter pins shown at $f$ are secured in holes in the guide pins limiting the lowest position of the plate $e$ and forming a stop therefore. The plate $e$ carries the ends of the heavy wire or girder underframe on which the attachment boss or like means is mounted; the underframe being secured to the plate by the short bolts and nuts shown at $g$. The laminated bow spring $h$ is interposed between the lower plate $e$ and the upper strip $c$, the lipped ends $k$ of the spring abutting on the lower plate $e$ and the central portion being in contact with the strip $c$. The ends of the spring are located in position by lugs $j$ $j$. The spring $h$ is composed of a number of thin spring leaves of suitable material and width adapted to nest together and preferably graduated in length to conform with the varying bending-movement after the well-known principle for a laminated spring. The lowest or main leaf is formed with slightly lipped ends as shown at $k$ to form a horizontal surface for abutment on the plate $e$ but this may be omitted in the other plates.

In the centre of each leaf is a depression $l$ forming a nib or projection in the other side, the nib of one plate engaging with the depression in the leaf above and the nib on the top leaf engaging with a depression $m$ formed in the centre of the strip $c$. A groove is preferably formed leading to this depression $m$ for ease in inserting the spring.

The leaves of the spring thus all nest together and the top of the spring is located by the depression $m$, and the lower ends by the lugs $j\ j$. The spring is thus retained in position while any single leaf, or the whole spring, may be easily slipped out or inserted by the fingers of the rider. To insert the spring, one end of the spring is placed in position on the plate $e$, the projection on the top spring is engaged in the slot in the upper strip $c$, and then by pressing the other end of the spring upwards the whole spring may easily be slipped into place. If desired a lug $n$ may be formed on the upper strip $c$ as a further security for retaining the spring in place and also a block $o$, (Fig. 3) of metal or other suitable material may be interposed between the strip $c$ and the saddle frame strip $b$ to further strengthen the strip $c$.

From the above description it will be obvious that by removing or adding leaves to the spring the strength thereof may be varied between any required limits. My invention of course is not confined to the embodiment described. Springs as described by my invention may also be employed for other obvious purposes such as in seats for motor-cars, side-cars and the like, or for auxiliary seats adapted to be fitted on motor-cycle carriers etc.

What I claim then is:—

1. Improved spring arrangement for saddles and the like comprising in combination a frame part, a seat portion, said frame part and seat portion being adapted for relative movement, a metal plate reinforcing said seat portion, rods depending from said plate for guiding said frame and seat parts in their relative movements, a spring comprised of a plurality of removable leaves disposed between said frame and said plate, means connected with said plate and co-operating with means on the leaves of the spring to locate said spring with respect to the seat said means on said leaves also serving to locate said leaves in relation to one another.

2. Improved spring arrangement for saddles and the like comprising in combination a frame part, a seat portion, said frame part and seat portion being adapted for relative movement, a metal plate reinforcing said seat portion, rods depending from said plate for guiding said frame and seat parts in their relative movements, a spring comprised of a plurality of removable leaves disposed between said frame and said plate, means connected with said plate and co-operating with means on the leaves of the spring to locate said spring with respect to the seat said means on said leaves also serving to locate said leaves in relation to one another, said means comprising a nib pressed in the metal of each component leaf, the various nibs being formed hollow and nesting together.

3. A saddle having a flexible seat part and rigid pommel and cantle plates, said plates being supported by a metallic framework, springing means introduced between the seat and the framework comprising bow spring leaves of which a number are nested together in each spring by locating means formed upon them, said leaves being readily removable so that said springing means may be adjusted to the load on the seat.

In testimony whereof I affix my signature.

PERCY WILFRED DODD.